United States Patent [19]
Imai et al.

[11] Patent Number: 5,244,282
[45] Date of Patent: Sep. 14, 1993

[54] FLANGED LINEAR BALL BEARING

[75] Inventors: Katsuhito Imai, Yamanashi; Masashi Konomoto, Yokohama, both of Japan

[73] Assignee: THK Co., Ltd., Tokyo, Japan

[21] Appl. No.: 860,698

[22] Filed: Mar. 30, 1992

[30] Foreign Application Priority Data

Apr. 2, 1991 [JP] Japan .................................. 2-094931

[51] Int. Cl.⁵ .............................................. F16C 29/06
[52] U.S. Cl. ...................................................... 384/43
[58] Field of Search .................................... 384/43–45; 464/168

[56] References Cited

U.S. PATENT DOCUMENTS

| | | | |
|---|---|---|---|
| 3,014,382 | 12/1961 | Watson | 384/43 X |
| 4,204,717 | 5/1980 | Ernst et al. | 384/43 |
| 4,678,347 | 7/1987 | Butts et al. | 384/43 |
| 4,764,032 | 8/1988 | Tanaka | 464/168 X |

FOREIGN PATENT DOCUMENTS

| | | | |
|---|---|---|---|
| 2-2525 | 1/1990 | Japan . | |
| 199582 | 7/1967 | U.S.S.R. | 464/168 |
| 868712 | 5/1961 | United Kingdom . | |

*Primary Examiner*—Thomas R. Hannon
*Attorney, Agent, or Firm*—Armstrong, Westerman, Hattori, McLeland & Naughton

[57] ABSTRACT

Herein disclosed is a flanged linear ball bearing, in which a ball cage for arraying balls between a bearing housing and a bearing shaft is formed with a flange to be fixed on a mounting member such as a bed or a table. Thus, the bearing housing can be formed into a cylindrical shape having no flange so that it can be easily worked to drop the production cost and improve the production efficiency remarkably.

4 Claims, 8 Drawing Sheets

FLANGED LINEAR BALL BEARING

FIELD OF THE INVENTION AND RELATED ART STATEMENT

The present invention relates to a linear ball bearing such as a ball bush or a ball spline to be used in the linear guide portions of various industrial machines and, more particularly, to an improvement in a linear ball bearing of the type having a flange for fixing the bearing.

The linear ball bearing such as a ball bush or a ball spline is widely used in the linear guide portions of various industrial machines so that various produces are made to fit a variety od modes of usage.

Figure 10:
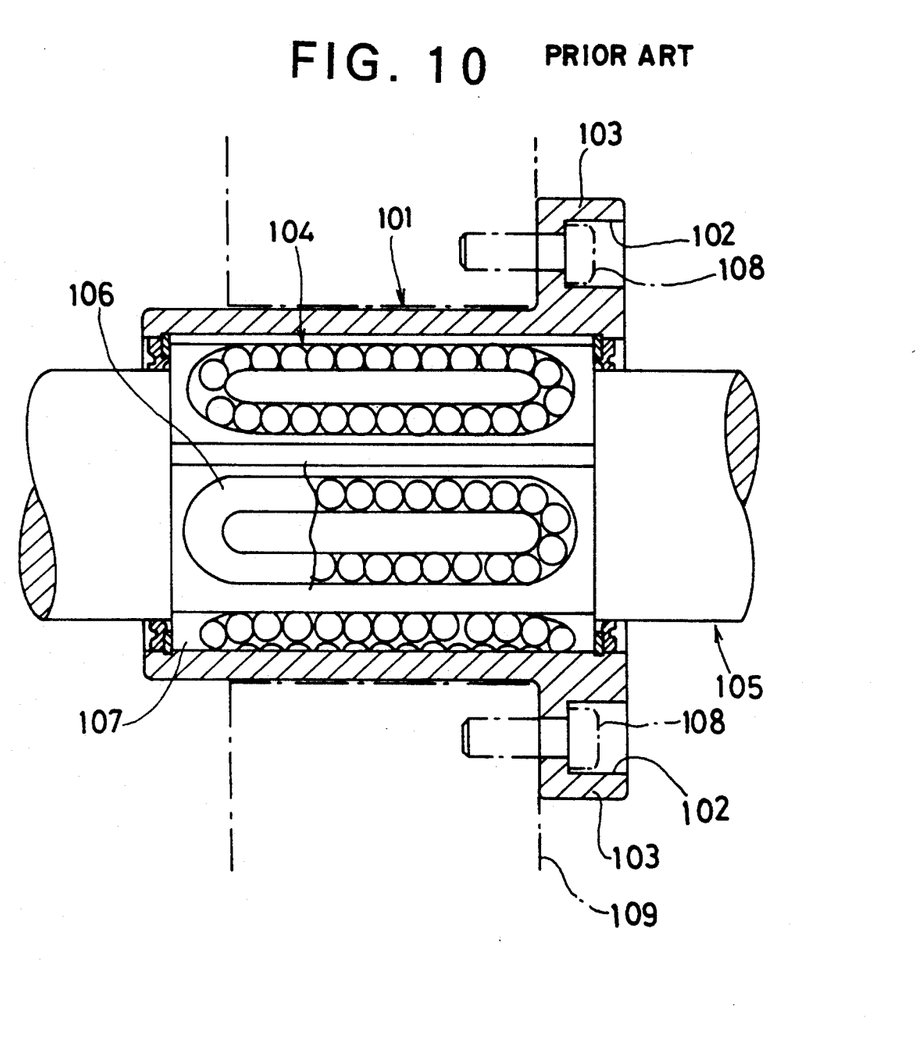
FIG. 10 is a side section showing the flanged linear ball bearing according to the prior art.

FIG. 10 shows one embodiment of the so-called "flanged ball bush", which is formed with a flange for fixing the bearing to the mounting member such as a bed or a table.

Specifically, the flanged ball bush is constructed to include: a bearing housing 101, which is formed to have a generally cylindrical section and is molded integrally with a flange 103 having fixing bolt holes 102 in its outer circumference so that it may linearly move around a bearing shaft 105 through a multiplicity of endlessly circulating balls 104; and a ball cage 107 which is formed with ball guide grooves 106 for circulating the balls 104 endlessly between the bearing shaft 105 and the bearing housing 101 and which is fixedly fitted in a hollow of the bearing housing 101. Thus, this ball bush is used by fixing the flange 103 on a mounting member 109 by means of fixing bolts 108 and by sliding the mounting member 109 and the bearing shaft 105 relative to each other.

Here in the linear ball bearing of this type, the bearing housing is required for a hardening treatment so as to enhance the wear resistance of the inner circumference of the bearing housing, on which the balls are guided to roll. However, this hardening treatment raises serious troubles in producing the aforementioned flanged ball bush. This reasoning will be described in the following. Since the flange is made thicker than the other portions of the bearing housing, a thermal distortion would be left in the bearing housing if the flange were hardened after having been ground down, so that the bearing housing could not be precisely finished. If, on the contrary, the flange were to be formed after the hardening treatment, the material would grow too hard to grind.

On the other hand, the flange bearing housing would contain a problem that its grinding would be far troublesome than that of a straight cylindrical bearing housing having no flange. This straight cylindrical bearing housing could be efficiently ground down at one step by using a centerless grinder, but the flanged bearing housing cannot be worked by the centerless grinder so that it has to be worked by a cylindrical grinder. Moreover, this grinding process requires two steps, i.e., the steps of grinding the cylindrical portion and the flange.

In the prior art, therefore, as means for solving that problem, there is proposed a linear ball bearing which is produced by molding a generally annular flange member and a bearing housing separately from each other and by integrating the flange and the bearing housing by press-fitting or brazing them after the hardening treatment of the bearing housing. However, another problem arises in the number of working steps at the producing time or the number of parts, and the means is not satisfied in view of the production cost and the production efficiency.

OBJECT AND SUMMARY OF THE INVENTION

The present invention has been conceived in view of the problems specified above and has an object to provide a flanged linear ball bearing which can drop the production cost and improve the production efficiency remarkably.

In order to achieve the above-specified object, according to the present invention, there is provided a flanged linear ball bearing which comprises: a bearing housing having a hollow portion therein and guided by a bearing shaft for linear movements; a multiplicity of balls held between the bearing housing and the bearing shaft for rolling under a load; and a ball cage fitted in the hollow portion of the bearing housing for holding and arraying the balls, wherein the improvement comprises a flange protruded from the ball cage for fixing the bearing on a mounting member such as a bed or table.

In this technical means, the flange to be protruded from the aforementioned ball cage may be formed by welding an annular flange member to the outer circumference of the ball cage. Preferably, however, the flange and the ball cage may be integrally formed by injection-molding or cutting a synthetic resin.

Moreover, the linear ball bearing, to which such technical means can be applied, may be exemplified by one, in which a plurality of endlessly circulating balls are held between a cylindrical bearing housing and a bearing shaft so as to bear their relative linear movements. The technical means can be applied not only to the ball bush of the prior art but also to a ball spline capable of performing torque transmissions between the bearing housing and the bearing shaft.

Since the flange is formed on the ball cage to form the bearing housing into a straight cylindrical shape in accordance with the aforementioned technical means, it becomes possible to facilitate the hardening treatment of the bearing housing remarkably and to grind it by means of the centerless grinder. As a result, the grinding treatment can be executed efficiently at a reasonable cost thereby to improve the production efficiency and drop the production cost drastically.

By eliminating the flange from the bearing housing, moreover, the bearing housing of the linear ball bearing having no flange can be converted to one for the flanged linear ball bearing so that the parts can be commonly used among different products. In this point, too, it is possible to improve the production efficiency and to drop the production cost.

If, furthermore, the flange and the ball cage are integrally formed by injection-molding a synthetic resin, a further improvement in the production efficiency can be expected because of necessity for an additional step of forming the flange.

BRIEF DESCRIPTION OF THE DRAWINGS

Other objects and features of the present invention will become apparent from the following description to be made with reference to the accompanying drawings, in which.

DESCRIPTION OF THE PREFERRED EMBODIMENTS

A flanged linear ball bearing according to the present invention will be described in the following with reference to the accompanying drawings.

Figure 1:
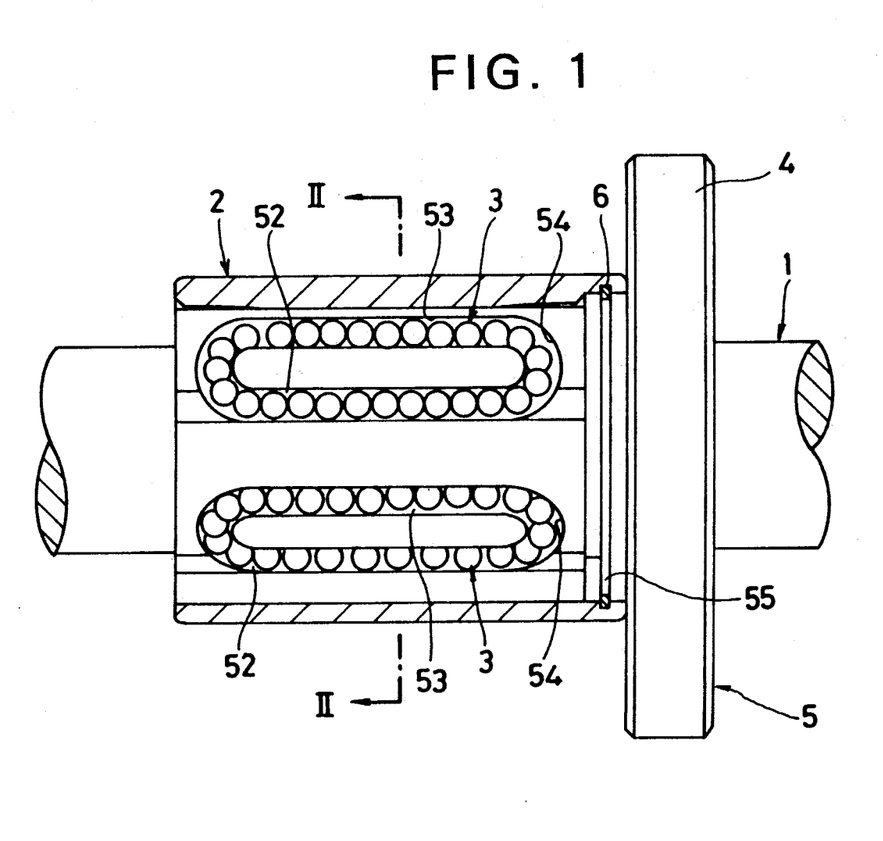
FIG. 1 is a side section showing a first embodiment of a flanged linear ball bearing according to the present invention.
Figure 2:
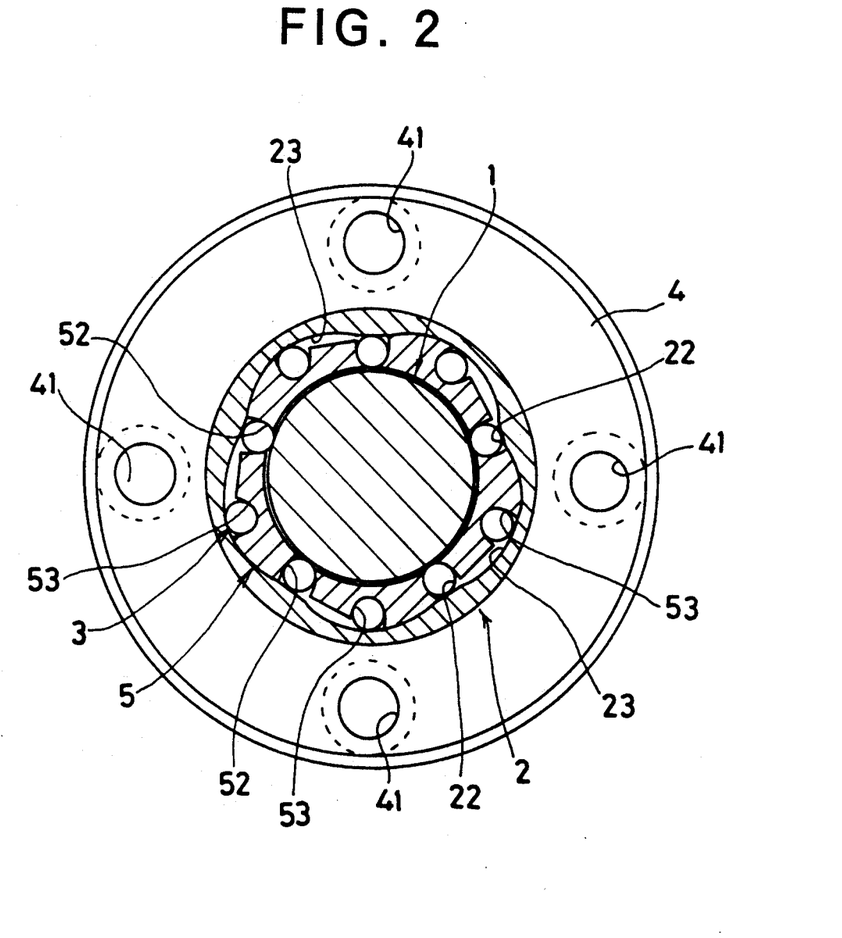
FIG. 2 is a section taken along line II—II of FIG. 1.

FIG. 1 is a side section showing a first embodiment of the flanged ball bush according to the present invention. The flanged ball bush of the present embodiment is constructed to include: a bearing housing 2 guided by a bearing shaft 1 for linear movements; a multiplicity of balls 3 for rolling while bearing a load between the bearing shaft 1 and the bearing housing 2; and a ball cage 5 having its outer circumference formed with a projecting flange 4 and fitted in a hollow portion 21 of said bearing housing 2 for holding and arraying the balls 3.

Figure 5:
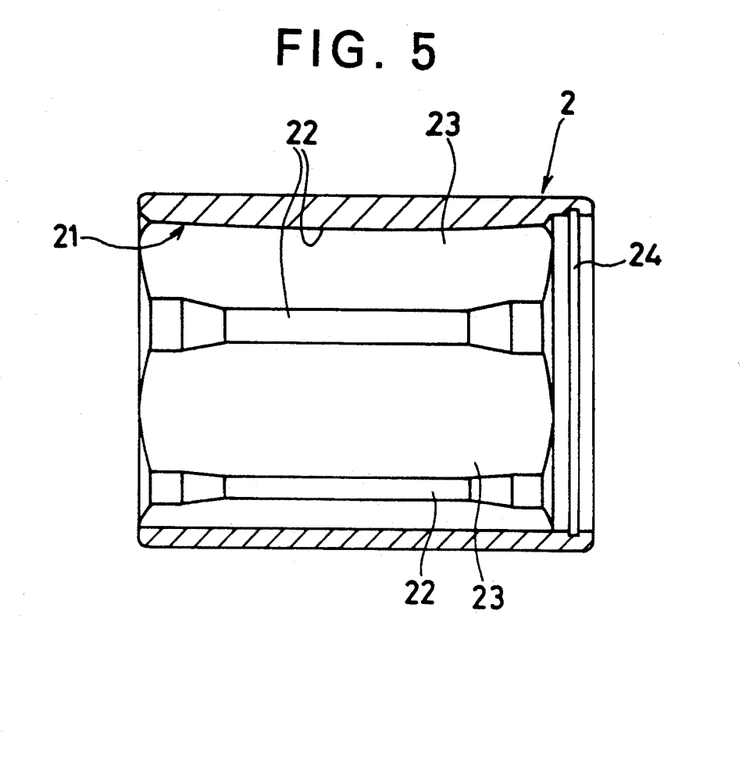
FIG. 5 is a side section showing a bearing housing according to the first embodiment.

First of all, the bearing housing 2 is formed into such a generally cylindrical shape as is loosely fitted at a predetermined clearance around the bearing shaft 1 and has its inner circumference formed, as shown in FIG. 5, with five load rolling faces 22, which are spaced at an equal distance in the circumferential direction for holding the balls 3 with the bearing shaft 1, and non-load rolling grooves 23, each of which is interposed between two adjoining load rolling faces 22 for rolling the balls released from the load. Moreover, the hollow portion 21 is formed at its one opening edge with a ring-shaped groove 24 which is circumferentially extended for receiving a later-described octagonal clip 6.

Figure 3:
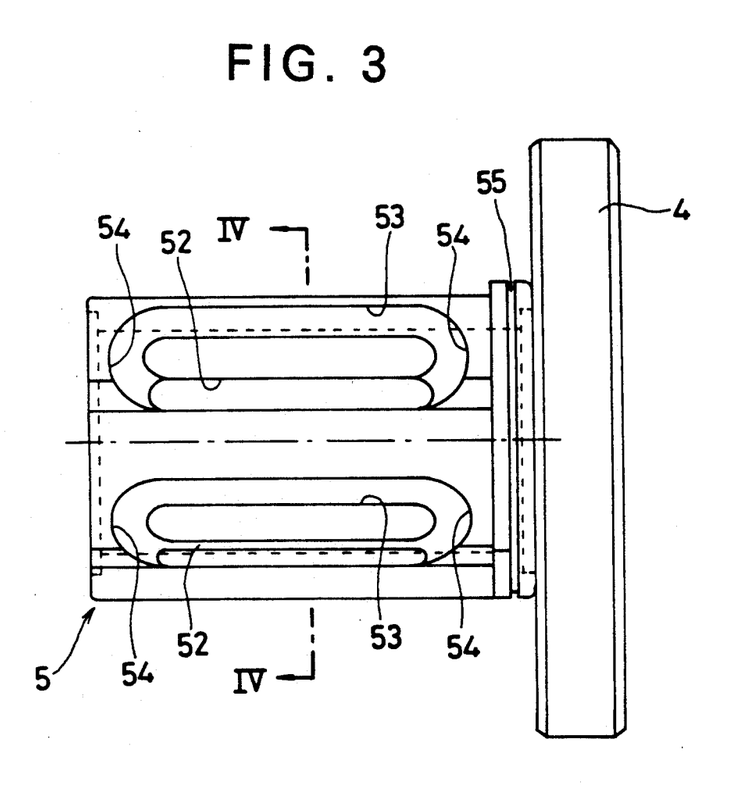
FIG. 3 is a side elevation showing a ball cage according to the first embodiment.
Figure 4:
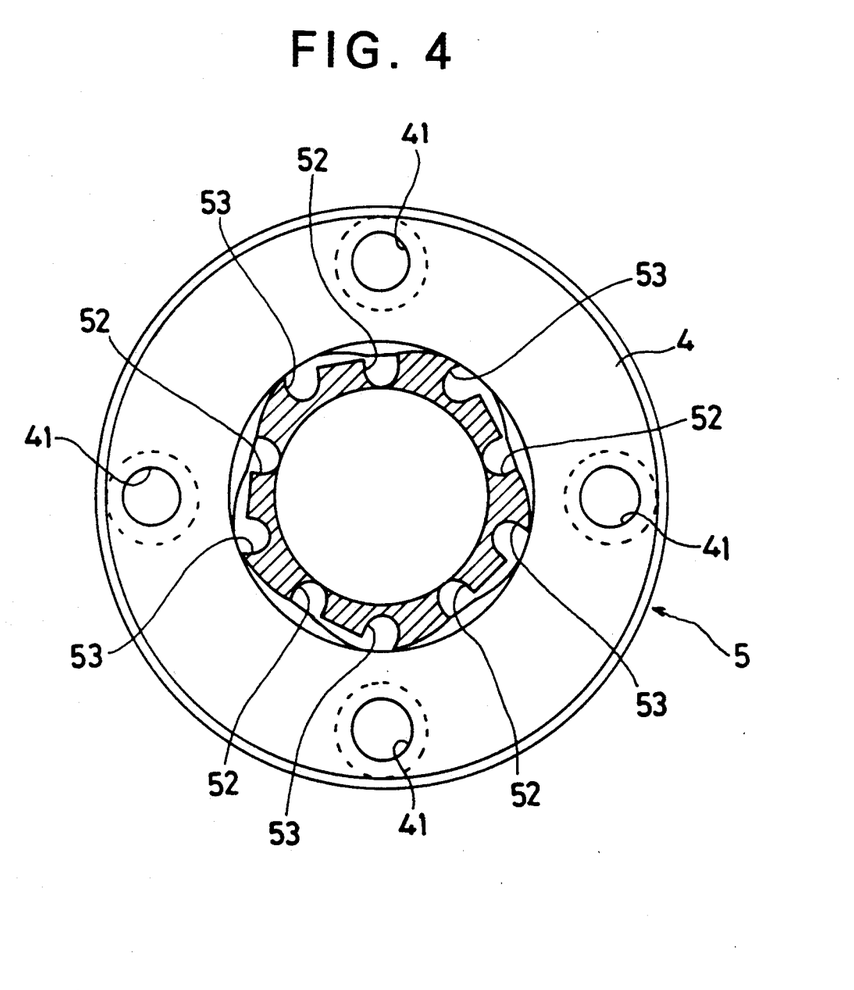
FIG. 4 is a section taken along line IV—IV of FIG. 3.

On the other hand, the ball cage 5 is formed, as shown in FIGS. 3 and 4, into a generally cylindrical shape with a through hole 51 for fitting the bearing shaft 1 therein and has its outer circumference formed with the flange 4 which in turn is formed with bolt head holes 41. The ball cage 5 is formed integrally with the flange 4 by an injection molding of a synthetic resin. The ball cage 5 has its outer circumference formed, in a manner to correspond to the individual load rolling faces 22, with: slotted load ball guide grooves 52 for preventing the balls 3 rolling on the aforementioned load rolling faces 22 from coming out when the bearing housing 2 is pulled out of the bearing shaft 1; non-load ball guide grooves 53 for arraying the released balls rolling in the non-load rolling grooves 23; and ball turning grooves 54 for establishing connections and communications between the load ball guide grooves 52 and the non-load ball guide grooves 53 to circulate the balls 3 endlessly between the two grooves 52 and 53. On the other hand, the outer circumference of the ball cage 5 is formed with a ring-shaped groove 55 which corresponds to the ring-shaped groove 24 of the aforementioned bearing housing 2. Thus, a space is formed between the ring-shaped groove 24 of the bearing housing 2 and the ring-shaped groove 55 of the ball cage 5, which are opposed to each other, when the ball cage 5 is fitted on the bearing housing 2.

Figure 6:
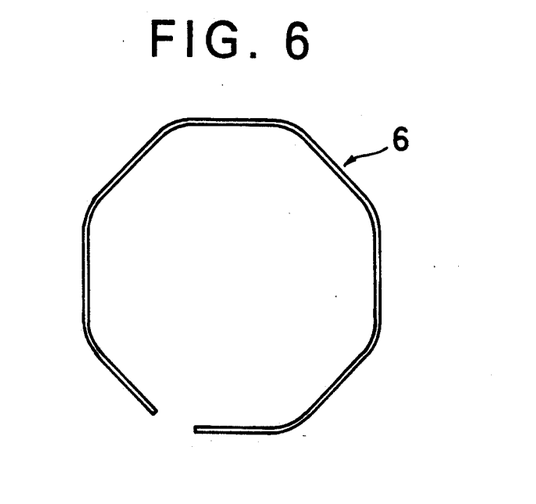
FIG. 6 is a front elevation showing a octagonal clip according to the first embodiment.
Figure 7:
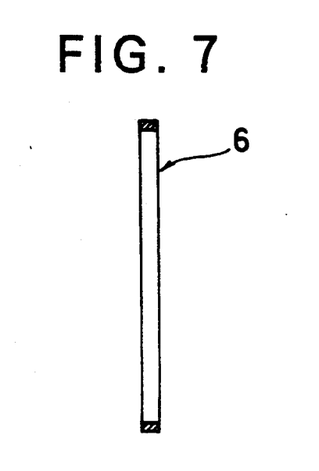
FIG. 7 is a side section showing the octagonal clip according to the first embodiment.
Figure 8:
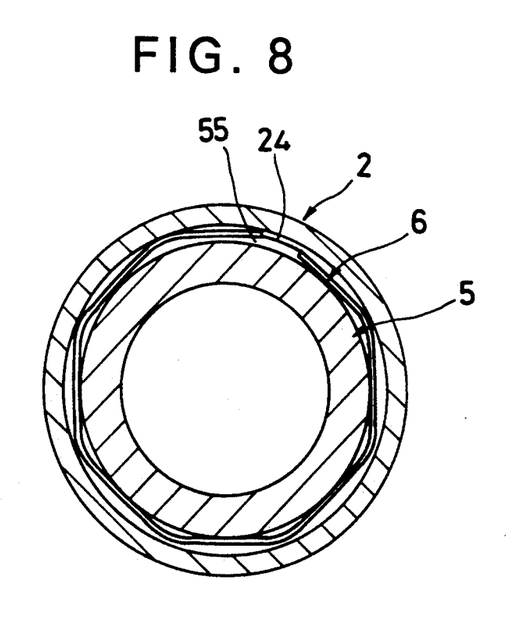
FIG. 8 is a front section showing the coupled state of the bearing housing and the ball cage by using the octagonal clip.

In the present embodiment, these bearing housing 2 and ball cage 5 are coupled by means of an octagonal clip 6, as shown in FIGS. 6 and 7. A specific coupling procedure will be described in the following. At first, the octagonal clip 6 is fitted in the ring-shaped groove 24 formed in the inner circumference of the bearing housing 2, and the ball cage is then press-fitted in the hollow portion 21 of the bearing housing 2. Then, the end portion of the ball cage 5 comes into abutment against the individual central side portions 61 of the octagonal clip 6 so that this clip 6 is elastically deformed or expanded. As the press-fitting of the ball cage 5 is continued, its ring-shaped groove 55 is registered with the ring-shaped groove 24 of the bearing housing 2. Then, the octagonal clip 6 has its central side portions 61 stepping into the ring-shaped groove 55 of the ball cage 5, until its corners 62 are fitted in the ring-shaped groove 24 whereas its central side portions 61 are fitted in the ring-shaped groove 55. Thus, the bearing housing 2 and ball cage 5 are coupled to each other.

If, moreover, the flanged ball bush thus constructed and assembled according to the present embodiment has its flange 4 of the ball cage 5 mounted on a (not-shown) member by means of (not-shown) bolts, it can establish relatively linear movements between the flange mounting member and the bearing shaft 1, as in the flanged ball bush of the prior art.

Thanks to the flange 4 protruded from the ball cage 5 according to the present embodiment, however, the troublesome working process required in the prior art for forming the flange 4 on the bearing housing 4 can be eliminated to facilitate the working of the bearing housing 2 remarkably thereby to improve the production efficiency and drop the production cost.

Especially according to the present embodiment, the flange 4 is formed integrally with the ball cage 5 by the injection molding of a synthetic resin so that the step of forming the flange 4 need not be added to improve the productivity better.

Figure 9:
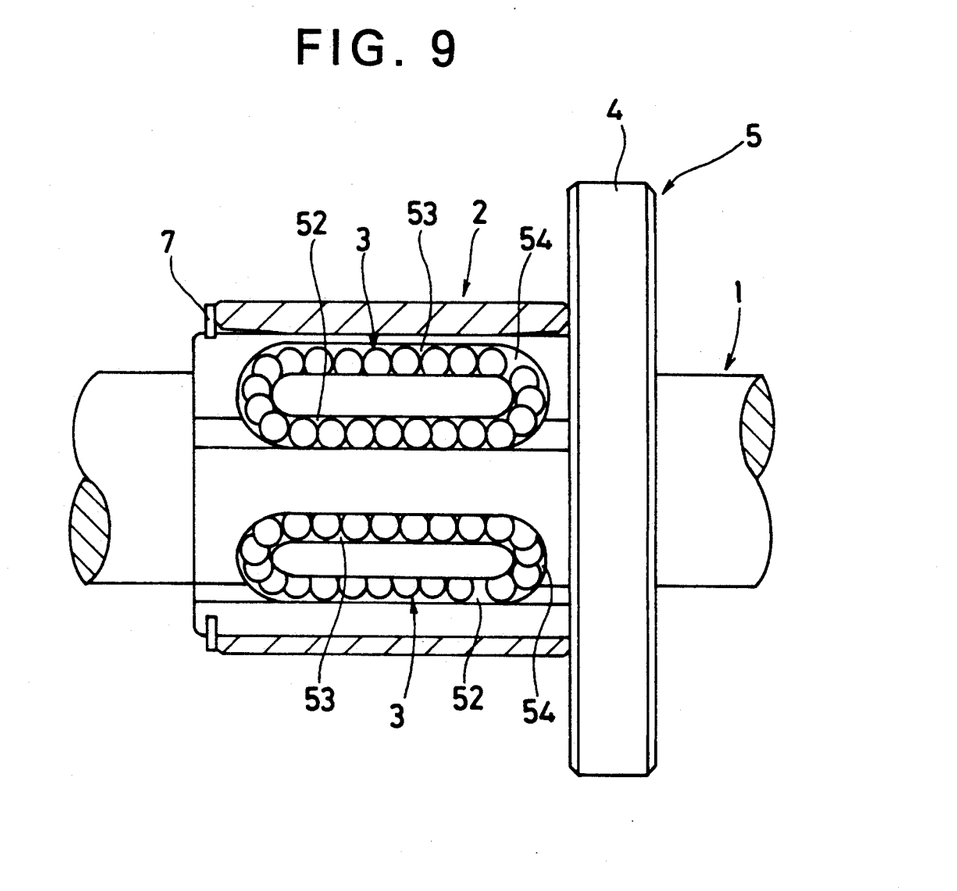
FIG. 9 is a side section showing a second embodiment of the flanged linear ball bearing according to the present invention.

FIG. 9 shows a second embodiment of the flanged ball bush according to the present invention.

The flange 4 and the ball cage 5 are integrally molded in this embodiment, too, but the method of coupling the ball cage 5 and the bearing housing 2 is different from that of the first embodiment. Specifically, according to this embodiment, after the ball cage 5 has been fitted in the bearing housing 2, a stopper ring 7 is fitted on the outer circumference of the end portion of the ball cage 5 projecting from the bearing housing 2, and the stopper ring 7 and the bearing housing 2 are engaged to couple the ball cage 5 and the bearing housing 2. Incidentally, the remaining structure is identical to that of the foregoing first embodiment, and its description will be omitted by giving the common reference numerals to the Drawing.

In this flanged ball bush, too, the flange 4 is molded integrally with the ball cage 5 thereby to make it possible to improve the production efficiency and drop the production cost.

What is claimed is:

1. A flanged linear ball bearing comprising: a bearing housing having a hollow portion therein and guided by a bearing shaft for linear movements; a multiplicity of balls held between said bearing housing and said bearing shaft for rolling under a load; and a ball retainer having flange formed integrally with the outer circumference thereof for fixing said bearing on a mounting member and fitted in the hollow portion of said bearing housing for holding and arraying said balls.

2. A flange linear ball bearing comprising: a bearing housing having a hollow portion therein and guided by a bearing shaft for linear movements; a multiplicity of balls held between said bearing housing and said bearing shaft for rolling under a load; and a ball retainer having a flange formed integrally with the outer circumference thereof for fixing said bearing on a mounting member and fitted in the hollow portion of said bearing housing for holding and arraying said balls;

wherein said flange is formed integrally with said ball cage by an injection molding of a synthetic resin.

3. A flange linear ball bearing comprising: a bearing housing having a hollow portion therein and guided by a bearing shaft for linear movements; a multiplicity of balls held between said bearing housing and said bearing shaft for rolling under a load; and a ball retainer having a flange formed integrally with the outer circumference thereof for fixing said bearing on a mounting member and fitted in the hollow portion of said bearing housing for holding and arraying said balls; and a clip fixing said bearing housing and said ball cage.

4. A flange linear ball bearing according to claim 3, wherein said clip is formed with a polygon having its corners fitted in a ring shaped groove, which is formed in the inner circumference of said bearing housing, and its central portions of the sides joining said corners fitted in a ring-shaped groove, which is formed in the outer circumference of ball cage.

* * * * *